United States Patent
Negi et al.

(10) Patent No.: US 11,568,305 B2
(45) Date of Patent: Jan. 31, 2023

(54) SYSTEM AND METHOD FOR CUSTOMER JOURNEY EVENT REPRESENTATION LEARNING AND OUTCOME PREDICTION USING NEURAL SEQUENCE MODELS

(71) Applicant: Genesys Telecommunications Laboratories, Inc., Daly City, CA (US)

(72) Inventors: Sapna Negi, Galway (IE); Maciej Dabrowski, Galway (IE); Aravind Ganapathiraju, Hyderabad (IN); Emir Munoz, Galway (IE); Veera Elluru Raghavendra, Hyderabad (IN); Felix Immanuel Wyss, Zionsville, IN (US)

( * ) Notice: Subject to any disclaimer, the term of this patent is extended or adjusted under 35 U.S.C. 154(b) by 967 days.

(21) Appl. No.: 16/379,110

(22) Filed: Apr. 9, 2019

(65) Prior Publication Data

US 2020/0327444 A1 Oct. 15, 2020

(51) Int. Cl.
| | |
|---|---|
| G06Q 20/00 | (2012.01) |
| G06N 20/00 | (2019.01) |
| G06F 21/60 | (2013.01) |
| G06N 3/04 | (2006.01) |
| G06N 3/08 | (2006.01) |
| G06Q 30/06 | (2012.01) |

(52) U.S. Cl.
CPC ......... G06N 20/00 (2019.01); G06F 21/602 (2013.01); G06N 3/04 (2013.01); G06N 3/08 (2013.01); G06Q 30/0631 (2013.01)

(58) Field of Classification Search
CPC ........... G06N 20/00; G06N 3/04; G06N 3/08; G06N 5/003; G06N 7/005; G06N 3/0445; G06F 21/602; G06Q 30/0631; G06Q 30/0281; G06Q 30/016
USPC .......................... 705/16, 21, 59; 380/44, 262
See application file for complete search history.

(56) References Cited

U.S. PATENT DOCUMENTS

2015/0296026 A1* 10/2015 Smyth .................... H04L 67/02
709/228

OTHER PUBLICATIONS

PCT International Search Report regarding co-pending application No. PCT/US2020/027348 dated Jun. 19, 2020.
(Continued)

*Primary Examiner* — Dante Ravetti

(57) ABSTRACT

A system and method are presented for customer journey event representation learning and outcome prediction using neural sequence models. A plurality of events are input into a module where each event has a schema comprising characteristics of the events and their modalities (web clicks, calls, emails, chats, etc.). The events of different modalities can be captured using different schemas and therefore embodiments described herein are schema-agnostic. Each event is represented as a vector of some number of numbers by the module with a plurality of vectors being generated in total for each customer visit. The vectors are then used in sequence learning to predict real-time next best actions or outcome probabilities in a customer journey using machine learning algorithms such as recurrent neural networks.

14 Claims, 8 Drawing Sheets

(56) References Cited

OTHER PUBLICATIONS

Guo, Cheng and Felix Berkhahn. "Entity Embeddings of Categorical Variables". arXiv: 1604.06737v1 [cs.LG] Apr. 22, 2016 <https://arxiv.org/pdf/1604.06737.pdf> accessed Apr. 9, 2019.

Lang, Tobias and Matthias Rettenmeier. "Understanding Consumer Behavior with Recurrent Neural Networks". <https://doogkong.github.io/2017/papers/paper2.pdf> accessed Apr. 9, 2019.

Wu, Ledell, et al. "StarSpace: Embed All Things!" arXiv:1709.03856v5 [cs.CL] Nov. 21, 2017. <https://arxiv.org/pdf/1709.03856.pdf> accessed Apr. 9, 2019.

* cited by examiner

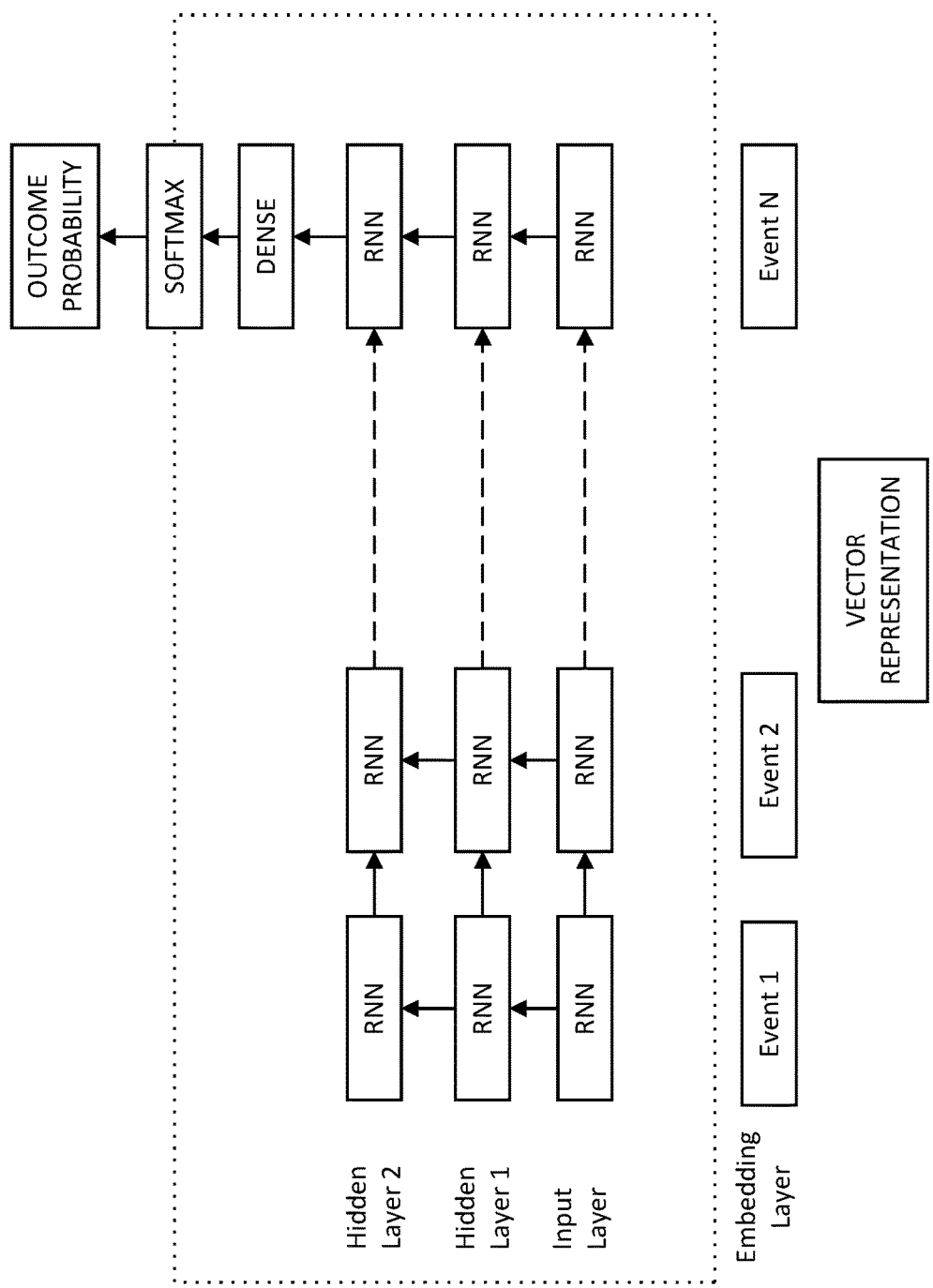

SYSTEM AND METHOD FOR CUSTOMER JOURNEY EVENT REPRESENTATION LEARNING AND OUTCOME PREDICTION USING NEURAL SEQUENCE MODELS

CROSS-REFERENCE TO RELATED APPLICATIONS

This application is related to U.S. provisional application 61/979,479, filed 14 Apr. 2014, titled "System and Method for Interaction Routing by Applying Predictive Analytics and Machine Learning to Web and Mobile Application Content", which was converted to pending U.S. patent application Ser. No. 14/686,404, filed 14 Apr. 2015, also titled "System and Method for Interaction Routing by Applying Predictive Analytics and Machine Learning to Web and Mobile Application Content" and the related pending divisional U.S. patent application Ser. No. 16/352,022, filed 13 Mar. 2019, also titled "System and Method for Interaction Routing by Applying Predictive Analytics and Machine Learning to Web and Mobile Application Content".

BACKGROUND

The present invention generally relates to telecommunications systems and methods, as well as the interaction of Web Sites, Mobile Apps, Analytics, and Contact Centers through the use of technologies such as predictive analytics, machine learning, WebRTC and VoIP plugins for browsers.

SUMMARY

A system and method are presented for customer journey event representation learning and outcome prediction using neural sequence models. A plurality of events are input into a module where each event has a schema comprising characteristics of the events and their modalities (web clicks, calls, emails, chats, etc.). The events of different modalities can be captured using different schemas and therefore embodiments described herein are schema-agnostic. Each event is represented as a vector of some number of numbers by the module with a plurality of vectors being generated in total for each customer visit. The vectors are then used in sequence learning to predict real-time next best actions or outcome probabilities in a customer journey using machine learning algorithms such as recurrent neural networks.

In one embodiment, a method is presented for converting raw customer journey events data from a plurality of customer's browsing sessions on a website to machine learning ingestible datasets for obtaining vector representations of web events, the method comprising: logging and storing events from the browsing sessions, wherein the events comprise activity data from the plurality of customers; pre-processing the raw data captured on the website, wherein the pre-processing further comprises the steps of: removing or masking/encrypting values in all columns containing personally identifiable information, identifying class attributes which need to be predicted during model training, identifying and removing columns which duplicate class attributes, removing array type data, removing timestamp data, converting all Boolean type columns into integer type, and replacing all null and unknown values, and, obtaining the ingestible datasets, which are capable of application to an algorithm for obtaining vector representations of web events.

Events may be stored with a common schema. The pre-processing steps may be performed in sequential order. The converting of all Boolean type data into an integer type further comprises replacing 'true' with a 1, and 'false' with a 0. The replacing all null and unknown values further comprises replacing all null and unknown values for integer types with a 1, with a 0.0 for double types, and 'unknown' for string types.

In another embodiment, a method is presented for obtaining vector representations for web events comprising: logging and storing events from the browsing sessions, wherein the events comprise activity data from the plurality of customers; pre-processing the raw data captured on the website, wherein the pre-processing further comprises the steps of: removing or masking/encrypting values in all columns containing personally identifiable information, identifying class attributes which need to be predicted when model training, identifying and removing columns which duplicate class attributes, removing array type data, removing timestamp data, converting all Boolean type data into integer type, and replacing all null and unknown values, and, obtaining the ingestible datasets, which are capable of application to an algorithm for obtaining vector representations of web events; training a feed forward neural network with the ingestible datasets; inputting the web events into the feed forward neural network, wherein, the output comprises vector representations of each activity in the web events; and appending vector columns to datasets for the corresponding activity in the web events. Additional steps may include: inputting the appended datasets into a trained neural network comprising LSTM cell units and dense neuron units, wherein input and hidden layers of the neural network comprise LSTM cell units and an output layer comprises the dense neuron units; obtaining a processed sequence which is input into the dense neuron layer as a single vector; applying a softmax function to the single vector; and obtaining an outcome probability for the vector.

The vector representations comprise a common n-dimensional space. The training comprises prediction of the event class of input. The trained feed forward neural network comprises a plurality of input layer branches. The plurality of input layer branches further comprises at least a first branch accepting categorical attributes and a second branch accepting continuous numerical value attributes.

The events are stored with a common schema. The converting of all Boolean type data into an integer type further comprises replacing 'true' with a 1, and 'false' with a 0. The replacing all null and unknown values further comprises replacing all null and unknown values for integer types with a 1, with a 0.0 for double types, and 'unknown' for string types. The pre-processing steps are performed in sequential order. Each event comprises a schema comprising characteristics and modalities.

The neural network has been trained using data pre-processed, the method for pre-processing comprising: identifying a set of outcome IDs for a given entity; defining a dataframe schema capturing visit ID, time ordered sequence of event IDs within a given visit, and class label; querying an event dataframe to populate the defined dataframe; removing outcome events from the sequence; and replacing event IDs with the respective event vectors.

The input layer accepts input in order of timestamp. The single vector comprises a representation of the previous events in the sequence.

BRIEF DESCRIPTION OF THE DRAWINGS

FIG. 7 is a diagram illustrating an embodiment of a system for a sequential neural network.

DETAILED DESCRIPTION

Figure 1:
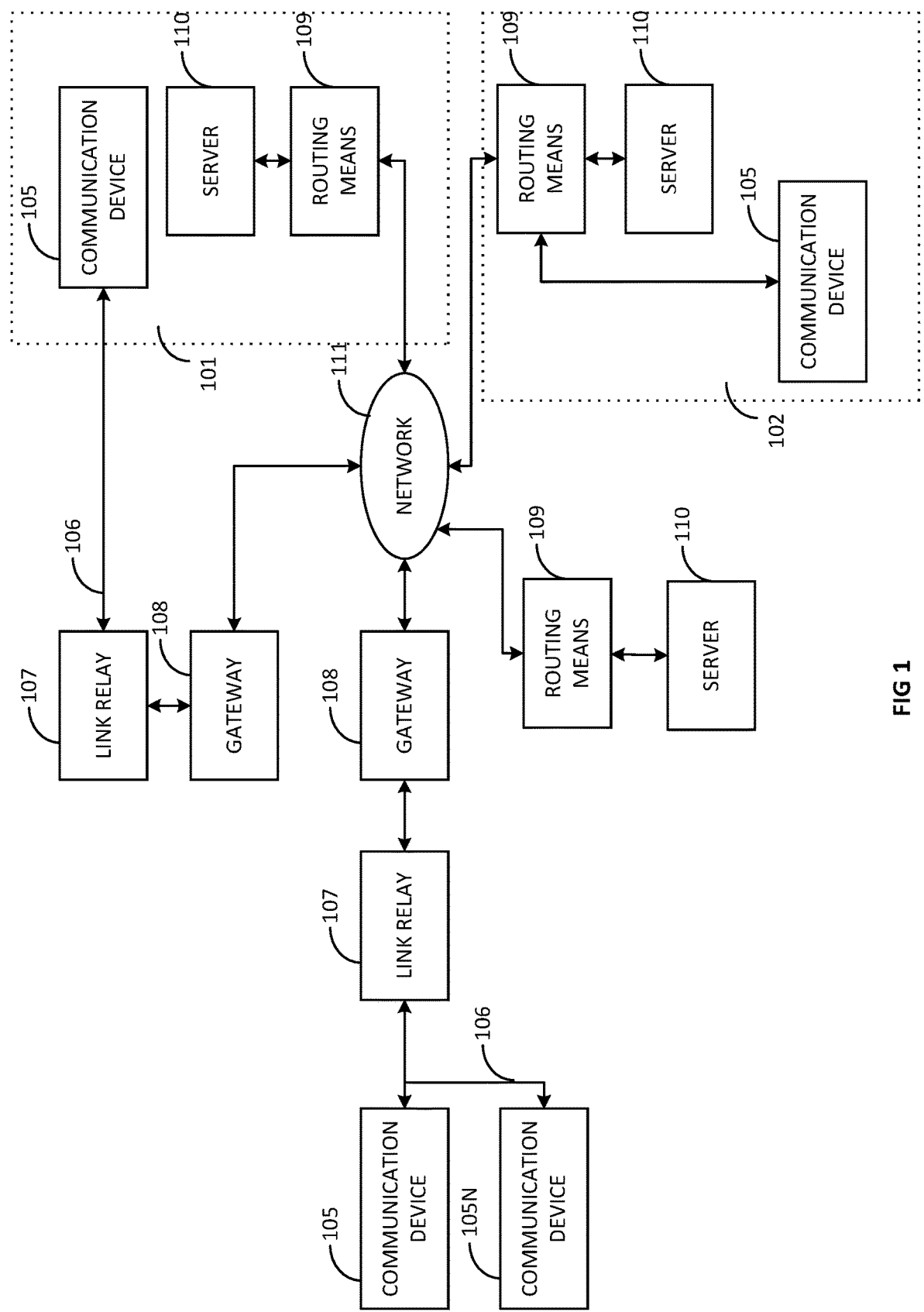
FIG. 1 is a diagram illustrating an embodiment of a system within a networked environment.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Nowadays, customers typically begin and conduct their interaction with a goods or service provider via the provider's website or mobile application, which are fast becoming the primary interfaces for organizations to communicate with their customers, suppliers and other stakeholders.

Traditional contact center routing to customer care agents is done via data derived from telephony parameters, such as the calling line ID or via simple choices made by customers via DTMF tones in Interactive Voice Response Sessions (e.g., Press 1 for Sales, 2 for Support, etc.).

There is now a completely new paradigm possible for contact centers whereby the customer begins the business interaction via the business web site or mobile application, which are now the primary interfaces for businesses to support their customers. With the emergence of technologies like VoIP and WebRTC, it is possible to build the Voice and Video functionality directly into the web site and browser or mobile application-based experience. This mechanism no longer requires a customer to even have a phone number as the media path is established peer-to-peer between the customer and the customer's browser or mobile application.

The growing adoption of WebRTC and further internet-based telecommunications developments by the likes of Google® (e.g., GoogleTalk®), Cisco (e.g., Jabber Guest), and others, comprising telephony plugins for web browsers have made it possible to build unified communications functions directly into browsers, to be invoked ad hoc by relevant embedded features of entity websites.

However, known implementations still only use such unified communications plugins to initiate calls via telephony protocols, such as SIP, into the PSTN, or an Enterprise PBX, and then route the calls using traditional methods like Calling Line ID or Dialed Number, together with either interactive voice response-based authentication (e.g., "enter your identifier") or basic call routing (e.g., "press 1 for support, press 2 for sales"). Accordingly, such implementations still only use browsers as a gateway into the known and traditional PSTN/PBX—based telecommunication model.

Interlocutors (agents in a contact center, to name a non-limiting example) receiving such calls must thus rely upon either any details about the calling user which their data systems may already hold, particularly if such a call is the first-ever real-time interaction of a customer with the entity associated with the website, or even both.

It is known to refine captured data with analytical data processing tools which track customer behavior and usage of online resources, like for instance Google Analytics® which analyzes website browsing patterns, however the output of such tools is usually aggregated and anonymized data, so are not suitable to support an intuitive and personalized experience for both of a calling user and their eventual interlocutor. Other tools (e.g., Marketo or HubSport) will rank visitors based on activities on the website. However, these tools do not apply in extending this personalization to a contact center mainly due to loss of context when a customer switches communication to a telephone or other audio communication means. Other patent publications in the art might include US2004/039775 and WO2014/071391, however again, the systems and methods disclosed do not provide a satisfactory level of personalization for users interacting with a website.

FIG. 1 is a diagram illustrating an embodiment of a system within a networked environment, indicated generally at 100. The networked environment includes a plurality of data processing devices, consisting of both mobile and static data processing terminals $105_N$, $110_N$, each capable of at least data communication with one another across a network, including a Wide Area Network ('WAN') 111 such as the world wide web or Internet.

Each mobile data communication device 105 comprises a mobile telephone handset 105 having wireless telecommunication emitting and receiving functionality over a cellular telephone network configured according to the Global System for Mobile Communication ('GSM'), General Packet Radio Service ('GPRS'), International Mobile Telecommunications-2000 (IMT-2000, 'W-CDMA' or '3G'), International Mobile Telecommunications-Advanced (ITU-R-compliant and known as '4G'), network industry standards, and wherein telecommunication is performed as voice, alphanumeric, or audio-video data using the Short Message Service ('SMS') protocol, the Wireless Application Protocol ('WAP'), the Hypertext Transfer Protocol ('HTTP'), or the Secure Hypertext Transfer Protocol ('HTTPS').

Each mobile telephone handset $105_N$ receives or emits voice, text, audio and/or image data encoded as a digital signal over a wireless data transmission 106, wherein the signal is relayed respectively to or from the handset by the geographically-closest communication link relay 107 or a plurality thereof. The plurality of communication link relays 107 allows digital signals to be routed between each handset 105 and their destination by means of a remote gateway 108 via an MSC or base station 109. Gateway 108 is, for instance, a communication network switch, which couples digital signal traffic between wireless telecommunication networks, such as the cellular network within which wireless data transmissions 106 take place, and the Wide Area Network 111. The gateway 108 further provides protocol conversion if required, for instance whether a handset 105 uses the WAP or HTTPS protocol to communicate data.

Alternatively, or additionally, one or more of the plurality of mobile data communication devices $105_N$ may have wired and/or wireless telecommunication emitting and receiving functionality over, respectively a wired Local Area Network ('LAN') and/or a wireless LAN ('WLAN') conforming to the 802.11 standard ('Wi-Fi'). In the LAN or WLAN, telecommunication is likewise performed as voice, alphanumeric and/or audio-video data using the Internet Protocol ('IP'), VoIP protocol, HTTP or HTTPS, the signal being relayed respectively to or from the mobile data communication device 105 by a wired (LAN) or wireless (WLAN) router 109 interfacing the mobile data communication device 105 to the WAN communication network 111. A mobile telephone handset 105 may have wireless telecommunication emitting and receiving functionality over the WLAN in addition to GSM, GPRS, W-CDMA and/or 3G, ITU-R/4G.

A typical handset $105_N$ for use with the system 100 is preferably that commonly referred to as a 'smartphone' (e.g., iPhone, Android phone, or an equivalent handset). Generally, the mobile terminal 105 may be any portable data processing device having at least wireless communication means and audio recording and storage means. It will therefore be readily understood by the skilled person from the present disclosure that one or more of the mobile data communication devices 105 may instead be a portable computer commonly referred to as a 'laptop' or 'notebook', a tablet, and the like.

Computer Systems

The system 100 includes one or more data processing terminals HON. In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 2A, 2B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON. In an embodiment, a server may be located on a computing or user device associated with a customer or user browsing a website.

Figure 2A:
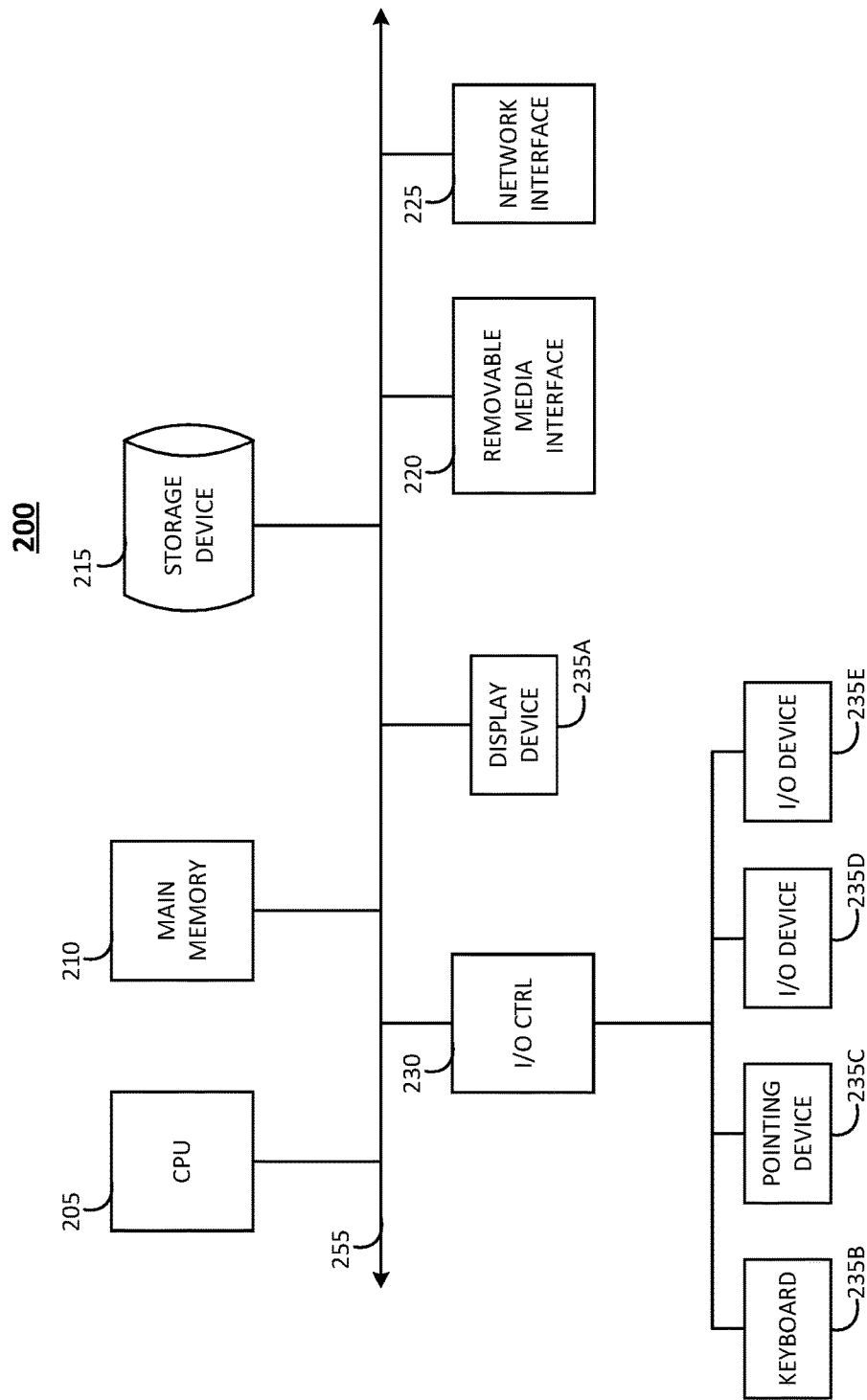
FIG. 2A is a diagram illustrating an embodiment of a computing device.
Figure 2B:
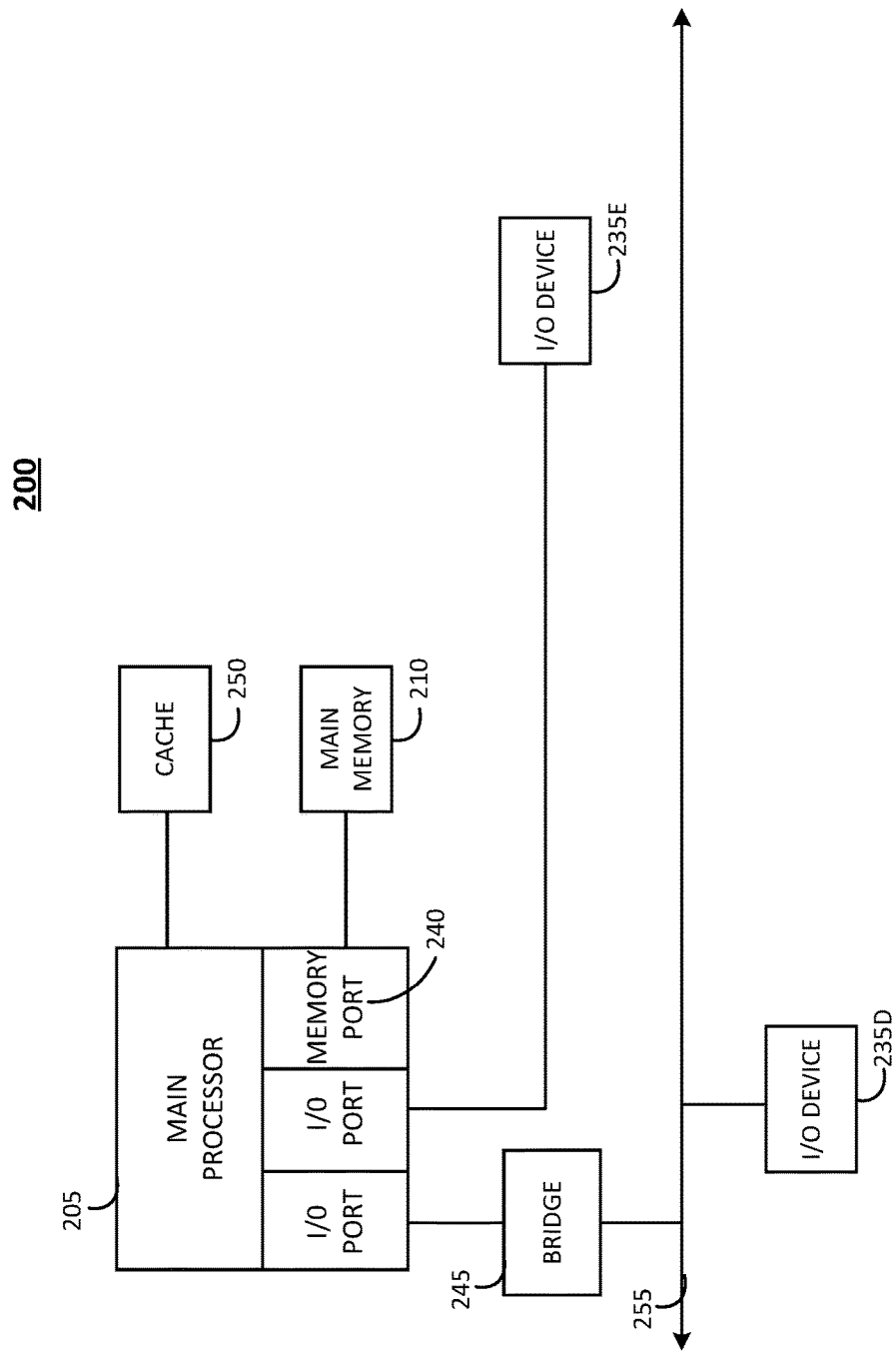
FIG. 2B is a diagram illustrating an embodiment of a computing device.

FIGS. 2A and 2B are diagrams illustrating an embodiment of a computing device as may be employed in an embodiment of the invention, indicated generally at 200. Each computing device 200 includes a CPU 205 and a main memory unit 210. As illustrated in FIG. 2A, the computing device 200 may also include a storage device 215, a removable media interface 220, a network interface 225, an input/output (I/O) controller 230, one or more display devices 235A, a keyboard 235B and a pointing device 235C (e.g., a mouse). The storage device 215 may include, without limitation, storage for an operating system and software. As shown in FIG. 2B, each computing device 200 may also include additional optional elements, such as a memory port 240, a bridge 245, one or more additional input/output devices 235D, 235E, and a cache memory 250 in communication with the CPU 205. The input/output devices 235A, 235B, 235C, 235D, and 235E may collectively be referred to herein as 235.

The CPU 205 is any logic circuitry that responds to and processes instructions fetched from the main memory unit 210. It may be implemented, for example, in an integrated circuit, in the form of a microprocessor, microcontroller, or graphics processing unit, or in a field-programmable gate array (FPGA) or application-specific integrated circuit (ASIC). The main memory unit 210 may be one or more memory chips capable of storing data and allowing any storage location to be directly accessed by the central processing unit 205. As shown in FIG. 2A, the central processing unit 205 communicates with the main memory 210 via a system bus 255. As shown in FIG. 2B, the central processing unit 205 may also communicate directly with the main memory 210 via a memory port 240.

In an embodiment, the CPU 205 may include a plurality of processors and may provide functionality for simultaneous execution of instructions or for simultaneous execution of one instruction on more than one piece of data. In an embodiment, the computing device 200 may include a parallel processor with one or more cores. In an embodiment, the computing device 200 comprises a shared memory parallel device, with multiple processors and/or multiple processor cores, accessing all available memory as a single global address space. In another embodiment, the computing device 200 is a distributed memory parallel device with multiple processors each accessing local memory only. The computing device 200 may have both some memory which is shared and some which may only be accessed by particular processors or subsets of processors. The CPU 205 may include a multicore microprocessor, which combines two or more independent processors into a single package, e.g., into a single integrated circuit (IC). For example, the computing device 200 may include at least one CPU 205 and at least one graphics processing unit.

In an embodiment, a CPU 205 provides single instruction multiple data (SIMD) functionality, e.g., execution of a single instruction simultaneously on multiple pieces of data. In another embodiment, several processors in the CPU 205 may provide functionality for execution of multiple instructions simultaneously on multiple pieces of data (MIMD). The CPU 205 may also use any combination of SIMD and MIMD cores in a single device.

FIG. 2B depicts an embodiment in which the CPU 205 communicates directly with cache memory 250 via a secondary bus, sometimes referred to as a backside bus. In other embodiments, the CPU 205 communicates with the cache memory 250 using the system bus 255. The cache memory 250 typically has a faster response time than main memory 210. As illustrated in FIG. 2A, the CPU 205 communicates with various I/O devices 235 via the local system bus 255. Various buses may be used as the local system bus 255, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 235A, the CPU 205 may communicate with the display device 235A through an Advanced Graphics Port (AGP). FIG. 2B depicts an embodiment of a computer 200 in which the CPU 205 communicates directly with I/O device 235E. FIG. 2B also depicts an embodiment in which local buses and direct communication are mixed: the CPU 205 communicates with I/O device 235D using a local system bus 255 while communicating with I/O device 235E directly.

A wide variety of I/O devices 235 may be present in the computing device 200. Input devices include one or more keyboards 235B, mice, trackpads, trackballs, microphones, and drawing tables, to name a few non-limiting examples. Output devices include video display devices 235A, speakers and printers. An I/O controller 230 as shown in FIG. 2A, may control the one or more I/O devices, such as a keyboard 235B and a pointing device 235C (e.g., a mouse or optical pen), for example.

Referring again to FIG. 2A, the computing device 200 may support one or more removable media interfaces 220, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 235 may be a bridge between the system bus 255 and a removable media interface 220.

The removable media interface 220 may, for example, be used for installing software and programs. The computing device 200 may further include a storage device 215, such as one or more hard disk drives or hard disk drive arrays, for storing an operating system and other related software, and for storing application software programs. Optionally, a removable media interface 220 may also be used as the storage device. For example, the operating system and the software may be run from a bootable medium, for example, a bootable CD.

In an embodiment, the computing device 200 may include or be connected to multiple display devices 235A, which each may be of the same or different type and/or form. As such, any of the I/O devices 235 and/or the I/O controller 230 may include any type and/or form of suitable hardware, software, or combination of hardware and software to support, enable or provide for the connection to, and use of, multiple display devices 235A by the computing device 200. For example, the computing device 200 may include any type and/or form of video adapter, video card, driver, and/or library to interface, communicate, connect or otherwise use the display devices 235A. In an embodiment, a video adapter may include multiple connectors to interface to multiple display devices 235A. In another embodiment, the computing device 200 may include multiple video adapters, with each video adapter connected to one or more of the display devices 235A. In other embodiments, one or more of the display devices 235A may be provided by one or more other computing devices, connected, for example, to the computing device 200 via a network. These embodiments may include any type of software designed and constructed to use the display device of another computing device as a second display device 235A for the computing device 200. One of ordinary skill in the art will recognize and appreciate the various ways and embodiments that a computing device 200 may be configured to have multiple display devices 235A.

An embodiment of a computing device indicated generally in FIGS. 2A and 2B may operate under the control of an operating system, which controls scheduling of tasks and access to system resources. The computing device 200 may be running any operating system, any embedded operating system, any real-time operating system, any open source operation system, any proprietary operating system, any operating systems for mobile computing devices, or any other operating system capable of running on the computing device and performing the operations described herein.

The computing device 200 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 200 may have different processors, operating systems, and input devices consistent with the device.

In other embodiments, the computing device 200 is a mobile device. Examples might include a Java-enabled cellular telephone or personal digital assistant (PDA), a smart phone, a digital audio player, or a portable media player. In an embodiment, the computing device 200 includes a combination of devices, such as a mobile phone combined with a digital audio player or portable media player.

A computing device 200 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 200 communicates with other computing devices 200 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein.

An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

Any user operating a terminal $105_N$, $110_N$, may access the website of an entity 101 providing commercial goods or services for obtaining information about the entity and/or its goods or services. The entity 101 accordingly operates a static terminal 110 configured as a web server for distributing the website to requesting remote terminals and at least one interlocutor at the entity operates a terminal for meeting any ad hoc telecommunication requires of their users. The entity 101 also has the use of one or more interlocutors at a remote contact center entity 102, which operates both static and mobile terminals for telecommunication support and assistance.

Figure 3:
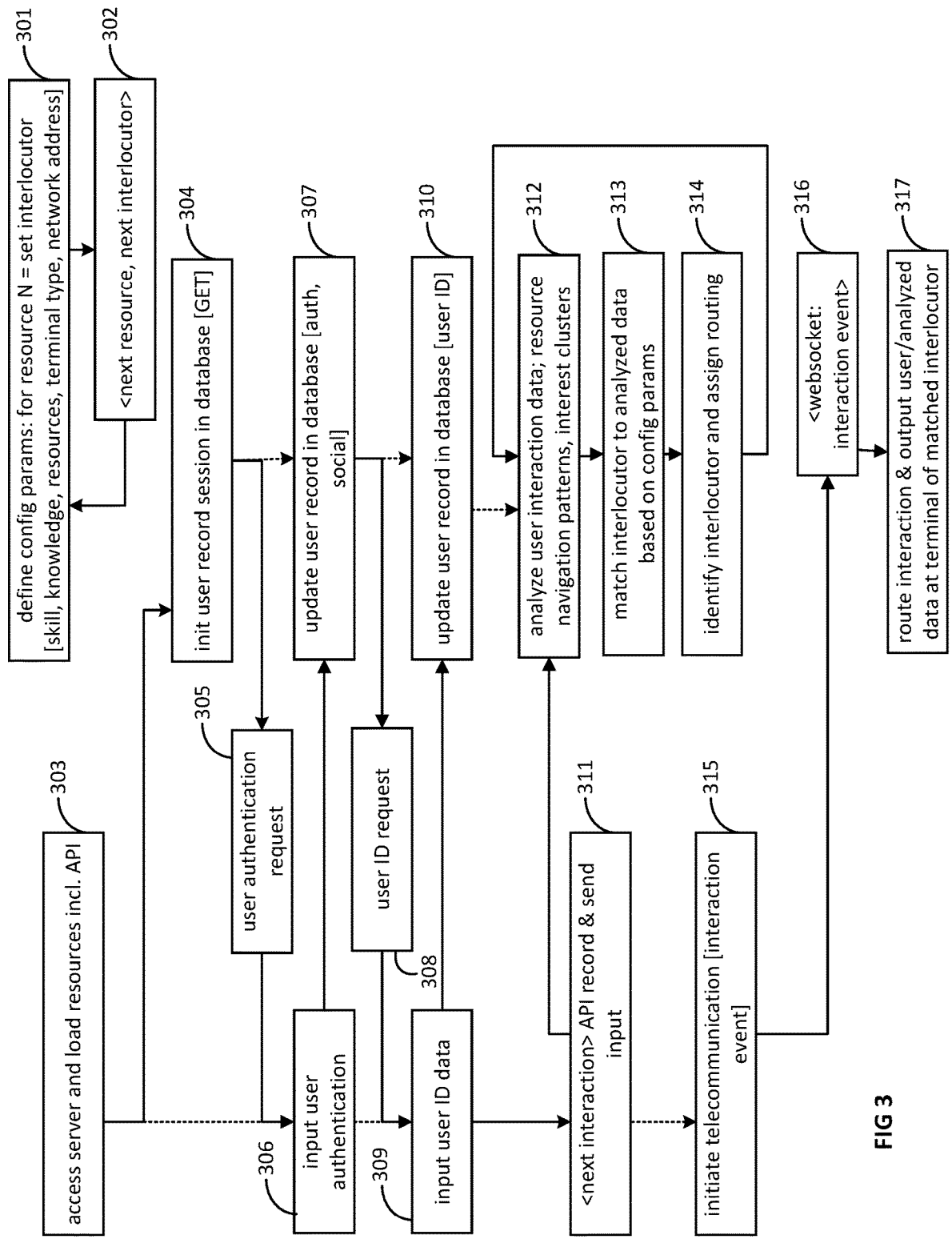
FIG. 3 is a flowchart illustrating an embodiment of a process for data processing.

FIG. 3 details the data processing steps of an embodiment of the method, performed in the environment of FIGS. 1, 2A, and 2B with the user data processing terminals and the entity data processing terminals. In an embodiment, a local user application is served by the entity server to the user mobile terminal accessing the entity website, which exposes at least one Application Programming Interface ('API') passing the user input data representative of the user interactions to an analyzing and routing application hosted by the server 110. When the mobile terminal accesses the website at the server PC, the API is loaded and then captures and communicates user interaction data to the server substantially in real time. The server application analyzes the communicated captured data for matching the user's interests, as derived from the analyzed interaction data, with one or more interlocutors associated with the entity, who is or are most apt to interact with the user in any real-time telecommunication which may follow the user's interaction with the website, e.g., a specialist interlocutor with relevant training in such derived interests. Whenever the user should initiate a real-time telecommunication, for instance with selecting a 'call', 'chat', 'videoconferencing' (and equivalents) button in a webpage, the server application routes any such telecommunication to the terminal of the matched interlocutor, preferably with the analyzed and/or captured data.

A real-time telecommunication between a user and matched interlocutor will be routed as a media path using any of alphanumerical (e.g. Instant Messaging), voice-only (e.g. telephone) or voice and video (e.g. Skype) formats, within any of the VoIP, WebRTC or PSTN network structures depending how the user is accessing the website (e.g. desktop or laptop, tablet or smartphone).

Accordingly, configuration parameters including interlocutor data, telecommunication formats and routing options and rules should first be input at the server into a database processed by the server application at step 301. Interlocutor data comprises characteristics for each interlocutor, such as name, areas of training and/or topic specialty, keywords and other logical and/or semantic distinguishing parameters, as well as respective terminal type, communication and functional capabilities in respect of the above formats and structures, and at least one network address for each interlocutor terminal. As many such interlocutor records may be input as there are potential interlocutors for a contacting user, and recorded interlocutors may receive further training to expand their telecommunication aptitude, whereby new interlocutor records may be instantiated, and current new interlocutor records may be updated at step 302, whereby control logically returns to step 301.

In parallel with the above, at any given time, a user at a terminal may access the server for loading and perusing the entity website in a new browsing session at step 303. The server accordingly creates a new user session record in the database at step 304 and makes access to the website resources conditional upon a login authentication step at step 305. The user subsequently inputs relevant authentication input data at a terminal at step 306, for instance a user name and/or login credential data of an online social media resource. Such authentication input data is forwarded to the server at step 307, at which it is recorded in the user session record.

The server may optionally make access to the website resources conditional upon a secondary identity verification step at step 308. The user subsequently inputs relevant identity input data at their terminal at step 309, for instance, a first name at least. Such identity verification input data is again forwarded to the server at step 310, at which it is again recorded in the user session record.

The user subsequently accesses and peruses the website resources, including any or all of website data, website metadata, webpage page tags, website cookies, website page headers, user social media data through conventional user page and link selections, at step 311. The user thus generates a stream of selections with a mouse, for example, known as a clickstream, and may also input one or more search strings for locating website resources. The API captures and communicates this interaction data substantially in real-time at step 311, whether as interaction event-driven updates or in aggregate form, for instances as a website navigation record representative of historical or sequential clicks, as a combination of both in dependence on bandwidth or load constraints.

The communicated captured interaction data is received by the server application at the server and analyzed in step 312 using various statistical predictive analytics techniques such as Bayesian inferencing or regression models that are known in the art. The user's interaction pattern is determined by the server application and an interaction prediction is output, such as when a customer will initiate an interaction or may cease to peruse the webpage or website. The interaction prediction is used to trigger a matching operation at step 313 of the user with a respective recorded interlocutor, which is accomplished by comparing the interaction pattern with interlocutor parameters, in particular areas of training and/or topical specialty and keywords and determining the recorded interlocutor with the closest record correlating the interaction pattern.

At step 314, the matching interlocutor record is selected and the routing path between the user and the selected interlocutor is determined based on the network address of the interlocutor terminal recorded in the database whereby, if the user should initiate a real-time telecommunication call from the website substantially at that time according to the prediction at step 315, the server receives the corresponding event call message at step 316 and the server application routes the call to the selected interlocutor at step 317, together with either the user's interaction pattern, or the captured and communicated user interaction data, or both.

The server application at the server is a multi-threaded application apt to perform each of steps 301-302, 304, 307, 310, 312-314, and 316-317 substantially concurrently for a plurality of interacting users and a plurality of interlocutors, and steps 312-314 themselves form a looping subroutine of the application whereby, should a user not initiate a predicted interaction at step 315, a subsequent captured and communicated interaction of the user translating a shifting point of interest would be processed at a next iteration of steps 312-314 and optimally result in potentially a different matched interlocutor with a respective different, but more relevant, set of parameters correlating with the shifted point of interest.

Figure 4:
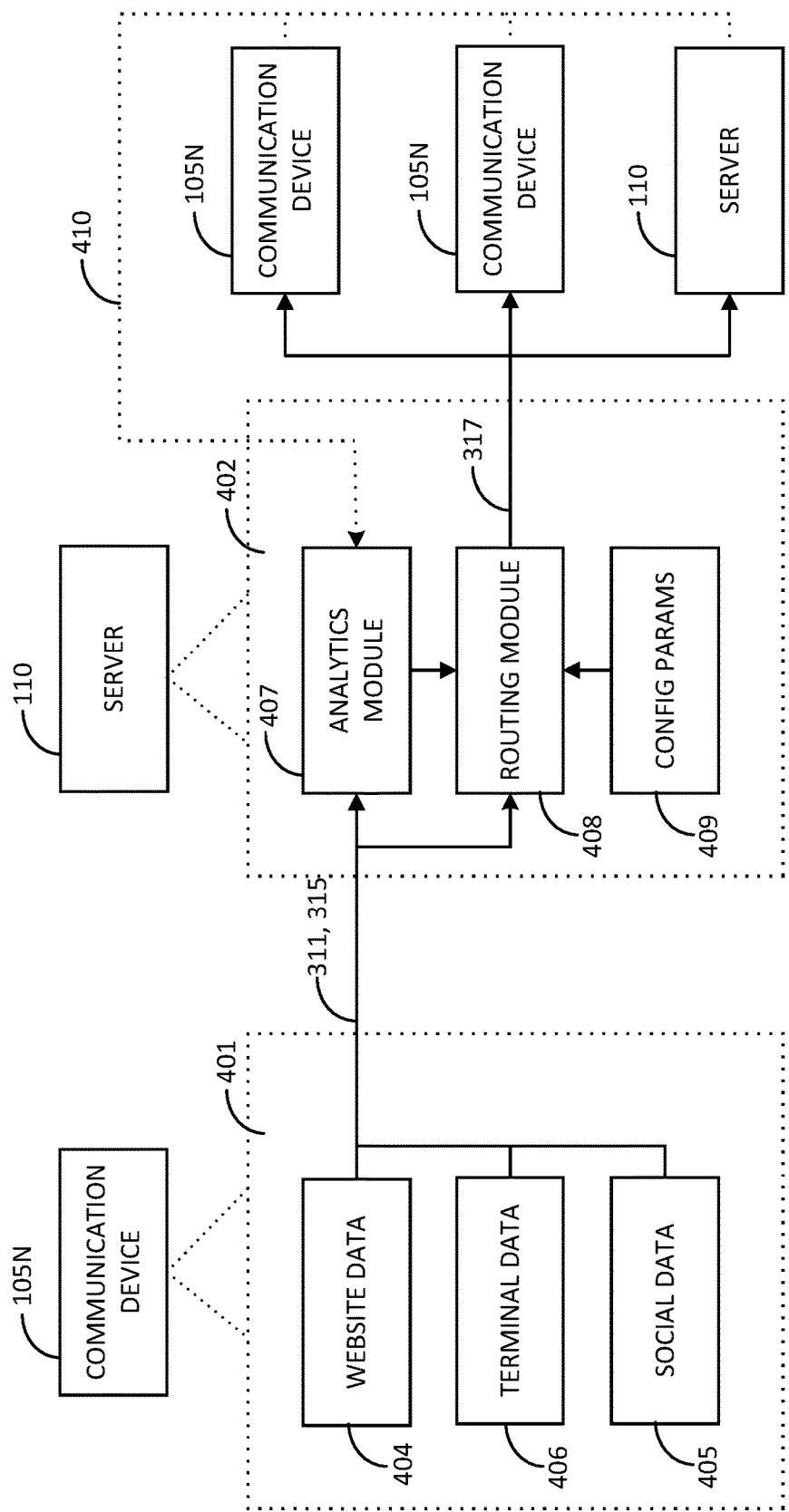
FIG. 4 is a diagram illustrating an embodiment of a system for application of predictive analytics and machine learning.

FIG. 4 is a block diagram illustrating a high-level implementation of the method of FIG. 3 within the system 100 in the environment of FIGS. 1, 2A, and 2B at runtime. The steps of the method may usefully be implemented in the system 100 as a user application 401 processed in conjunction with the browser of a user mobile terminal 105$_N$, which exposes one or more APIs to the website of the entity 101; a server application 402 processed by the entity terminal 110 with an associated, highly scalable database; and an interlocutor application, at its simplest a browser processed by the mobile or static terminal of the interlocutor to whom an interaction by the user is routed by the server application 402 that can be interpreted as an interactive management engine.

The user application 401 captures website data 404, such as cookies, web page headers and the like as the user interacts therewith on their mobile terminal 105, besides the social media data 405 gathered when the user logs into the website using social media-based authentication at step 306 and terminal data 406 indicative of at least the terminal type, and sends the captured data to the server application 402 per step 311.

The server application 402 is an analytics and routing application comprising a database, an analytics module 407, a routing module 408 and a parameterizing module 409, and which processes the captured user data it receives for identifying a relevant interlocutor associated with the entity 101 deemed most relevant, and routing an eventual telecommunication of the user thereto. The server application performs steps 301-302, 304-305, 307-308, 310, 312-314 and 316-317 (FIG. 3).

The parameterizing module 409 specifically performs steps 301 and 302, i.e., it is used for defining the attributes of each interlocutor in relation to the website data in logical and semantic terms, the attributes of interlocutor terminals and the attributes of telecommunication links with user terminals and such as terminal type, associated communication functionalities, minimum bandwidth levels for ensuring Quality of Service per communication type.

The analytics module 407 specifically performs steps 312-314, i.e., it receives all of the user data captured by the user application 401, thus including but not limited to, website data, website metadata, webpage page tags, website cookies, website page headers, one or more clickstream(s), one or more search string(s), a website navigation record representative of historical or sequential user page and link selections, user social media data, etc.

The routing module 408 specifically performs steps 316 and 317. For example, it is triggered by a telecommunication event and routes the user interaction to the selected interlocutor terminal with the output of the analytics module 407 and optionally also the captured user interaction data received pursuant to step 311.

The server application 402 configures a terminal to perform at least processing steps 301-302, 304-305, 307-308, 310, 312-314, and 316-317 as previously described, and which is interfaced with the operating system of the devices and network communication subroutines via one or more suitable APIs. Accordingly, the server application includes the analytics module 407, the routing module 408, and the parameterizing module 409, as previous described, and is therefore apt to request and obtain authentication data, identity verification data and captured interaction data from each remote user accessing the website resources. Website resources may be stored in a database as well as terminal types and capacities for interlocutors and users, telecommunication rules, and interlocutor profiles as established at steps 301 and 302, and the user session records comprising the captured interaction data for each remote user accessing the website resources.

Server application data specific to the analytics module 407 might include user analyzed data such as interaction patterns processed at step 312 and matched user-interlocutor pairs pursuant to step 313. Server application data specific to the routing module might include user terminal—interlocutor terminal communication paths output by the analytics module 407 for perusing by the routing module. The memory 210 may further comprise conventional local and/or network data that is unrelated to the server application, for instance used by the one or more further applications and/or the operation system.

Browser application data might comprise downloaded support application resources and a GUI output to the display 235A and into which downloaded resources are rendered. In the case of an interlocutor terminal, browser application data might also comprise analyzed user data (which consists of the output of the server application communicated to the interlocutor terminal 105 at step 317). In an alternative embodiment, a remote server 110 may also forward, or forward instead, thus the browser application data of the interlocutor terminal may further or alternatively comprise, some or all of the captured user data received by the remote server prior to analysis. The analyzed and/or captured data may be forwarded by the remote server for ad hoc referencing purposes or otherwise, so that the interlocutor has as much interaction supporting information at hand as is available in order to facilitate the telecommunication with the user.

In an embodiment, captured data may be analyzed based on a pattern and used to predict a successful outcome between the first user and a selected second user, i.e., the interlocutor or agent acting for the website being browsed by the first user, by the analytics module 407. A set of interaction management processes may be utilized that take a set of inputs that include raw user online data (website data, behavior data, demographics data, social data, mobile data, etc.), hard constraints configurations (agent and queue assignment, rules ensuring that particular business-defined constraints are met, call routing or interaction offers based on user online data, etc.) and analytics data in various forms (e.g., smart attributes (need for support, propensity to complete an outcome) derived based on the analysis of raw data using machine learning algorithms, persona clusters that dynamically group users based on their behavior and demographics, and journey patterns representing similar set of sequences of user actions) such as need or likelihood to achieve a specific outcome (which can change dynamically during a customer journey). Specific outcomes might comprise a product purchase, book a demo, require support, likelihood of accepting an interaction offer, etc. These processes may be used to make interaction management decisions that can include: identification of customers most valuable within a persona set given an outcome to maximize, smart call routing based on agent efficiency clusters, interaction recommendations to agents (what type of interaction—chat/audio/video—should be offered to which users and when), as well as automatic interaction offers focused on shaping customer journey and optimizing the business outcomes.

The analytics module 407 takes the inputs and processes the data using the analytics data. The outputs can be machine learned "smart attributes" ranking customers or actions against outcomes defined by the business and within persona clusters assigned by the machine learning or specified by the business associated with the website. Outputs may be interaction recommendations. The routing module 408 may be configured to make interaction recommendations to agents providing the agent with contextual data learned about the users (e.g., likelihood of accepting an interaction offer, likelihood of purchasing a product) based on inputs provided. For example, the analytics module 407 may identify the users that the agent should offer chat interactions to in order to increase product sales. This allows agents to focus on users or customers with predicted high value with respect to a given outcome, thus optimizing the resource utilization.

Outputs may also comprise automatic interaction offers. The analytics module 407 can make informed decisions and automatically offer interactions to selected users. Such interaction offers may be made based on the analytics data in order to optimize the business-defined outcomes. First, using the input data (as previously described) the component identifies the set of customers that are of high value with respect of a given outcome. Appropriate treatment (i.e., interaction offer) is then identified using predictive models built using various machine learning algorithms including decision trees, Bayesian inferencing and neural networks. The analytics module 407 can be configured to determine how many interaction offers should be automatically made to customers in order to maximize agent utilization and minimize users' or customers' queuing time.

The routing module 408 makes routing decisions and performs agent selection based on inputs provided (as previously described) using machine learned inference based on persona attributes (i.e., age, location, role, gender, etc.) and activities (i.e., page views, calls, chat, etc.)—Customers with similar personae and activities patterns do better with Agents like Agent X, customer X should have an agent reserved as they are about to make a call or the system has offered them an interaction and they are likely to accept, etc.

Journey Event Representation

During the processing of the user data, in order to apply state of the art machine learning algorithms on the data logs corresponding to an end user's interaction with a business (e.g., the user's activity stream on a website), each user activity, referred to as an event, is required to be represented as a vector. Events may also comprise activity by an entity such as the system, user, or agent, which triggers a change in the webpage's frontend or backend. In an embodiment, events are originally recorded as objects represented by a very large number of attribute-value pairs, where the attributes representing an event vary with the type of an event (e.g., page viewed, form filled, etc.). Simple methods to feed these objects to a machine learning algorithm require a considerable amount of manual effort by data scientists in choosing important attributes (also referred to as feature engineering). In creating representations of events as vectors (also referred to herein as 'event2vec'), raw events may be input into the algorithms and output as vector representations of the data in an end to end automated manner. The resulting vectors are dense and rich in terms of the information contained. The architecture for creation of representations of events as vectors is capable of handling multi-modal events (web clicks, calls, SMS, emails, chats, etc.). The events of different modalities can also be captured using different schemas. Thus, the method to create vectors from raw events may be schema-agnostic. As a result, the same system applying event2vec can be used to generate event vectors for a variety of machine learning based predictive systems which train on interaction data.

The vector representations of the events may be used in a number of analytics and prediction systems, such as in those described above in FIGS. 3 and 4. In an embodiment, captured data may be analyzed based on a pattern and used to predict a successful outcome between the first user (e.g., a customer browsing a website) and a selected second user (e.g., the interlocutor or agent acting for the website being browsed by the first user) by the analytics module 407. In another embodiment, captured data may be analyzed based on a pattern and used to predict a successful outcome of the first user and an action to achieve that outcome, such as the automatic presenting an offer to the first user or making a recommendation to an agent. In another embodiment, predicted outcomes may be presented as a ranked list to an agent, where the agent is able to manually select a desired outcome based on the information provided (such as probabilities and likelihoods of achieving a specific outcome by a customer). The agent may also be able to select a customer from a plurality of customers on the website to present an interaction to the customer(s) most likely to produce a desired outcome based on the analytics.

In yet another embodiment, outcome prediction may be used by businesses to manually or automatically anticipate when a customer browsing the website will need agent support based on the rise and fall in outcome probability. For example, event vectors may be used for temporal sequence modelling of customer journeys using machine learning algorithms like Recurrent Neural Networks (RNNs) (described in greater detail below), which can be used to predict outcomes (e.g., sale probability during a user session) on a business website. Outcome types may vary with business types. For example, an 'order placed' might be an outcome for an e-commerce business website, while 'mortgage application submitted' might be an outcome for a bank website.

In yet another embodiment, events represented as vectors can also be used in the analysis of user case studies, such as observing similarities and relationships in browsing behaviors by plotting events as point in graphs.

As previously mentioned, customer journey data may be captured in units referred to as events. Each event comprises information such as a unique ID and a timestamp, along with attributes that capture information, including but not limited to: customer profiles, interaction of the customer with the business, online browsing behavior on the website, etc. Customer journey data may further comprise information such as: who the customer is, where the customer is located, what hardware and/or software the customer is using, what items did the customer select on the website (or which buttons did they select), what was filled in on a web form by the customer, keywords used by the customer to perform searches, whether the customer has interacted with an agent, and other details around any such interaction (e.g., customer rating of the interaction, transcripts, outcome, etc.).

In an embodiment, the use of supervised machine learning methods for predictive analytics requires examples drawn from existing customer journeys comprising the information to be predicted (e.g., whether a business outcome was achieved). The examples are used to train a model capable of making predictions for new customer journeys. The examples comprise raw data logs of the customer journey which are required to be heavily processed before being input into machine learning algorithm(s) for model training and prediction. In addition, the processing steps may vary depending on the raw data format.

In an embodiment of representation learning, real world entities may be represented as vectors by training a predictive model on a secondary prediction task rather than the primary task of outcome prediction, where a suitable event attribute is identified to be predicted. Input may be gleaned from the entities and optimal vector representations may be learned for these entities during the training phase. Neural Networks can be used to learn dense vectors, which are typically used in the prior art to represent real world entities, which is otherwise not recorded as a multi-dimensional object (e.g., words). In an embodiment, representation learning can also be used to define a smaller and denser vector space for entities which are otherwise recorded using a greater number of dimensions/attributes in a vary sparse vector space (e.g. events) and are thus computationally expensive and inefficient to process when input to a machine learning model.

The events are highly heterogenous because they comprise information (or attributes) of different semantic types (time stamp, URLs, search keywords, quantities, etc.). In an embodiment, the method of converting events into vector representations maps events of different semantic types as vector in a common n-dimensional space, mathematically representing each event as an array of numerical values where the size of array corresponds to the number of dimensions. Embodiments of the methods herein comprise training a predictive neural network model to predict the value of a chosen event attribute and extracting the event vectors from the hidden layers of trained neural network.

In order to train a model for use in event2vec, several pre-processing steps are needed to convert the raw customer journey data captured from business websites to an ingestible form by the algorithm(s) during analysis of the data. Event logs from a customer's browsing session may be stored as json objects with a pre-defined set of attributes and the type of values to be recorded under these attributes. Each event is given a unique ID and timestamp. A common schema is used to capture events data from different businesses. It is within the scope of the embodiments for any number of businesses and their data to be used for analysis.

In an embodiment, the events data may be saved using a in a public cloud storage resource, e.g., Amazon S3., or on a private cloud resource. An example of a suitable format to save large volumes of events may be dataframes, which can be read and queried in a fast speed using big data processing tools like Spark. Large volumes of event data may be saved as multiple dataframes having a common format or schema. In an embodiment, dataframes comprise rows and columns with each row representing a unique event with a unique event ID and columns representing event attributes. The customer journey ID may be captured in the visitID attribute, and therefore multiple events may have the same visit ID. The events data is queried and may also be sliced into time intervals (e.g., per month) for easy processing. Examples of event attributes might comprise: ID, account, event type, when a visit was created (timestamp of the first activity in visit), timestamp indicating when the visitor should be considered as away, cookie ID of a customer or visitor, ID of a known (authenticated) customer, URL of the last page visited, a list of search terms used within the web visit, a list of personas IDs that the customer was assigned due to activities performed within the web visit, a list of outcome IDs achieved due to activities performed within the web visit, identify a search engine newsletter name or other marketing campaign source, a user agent string, a browser version, the language the browser is set to, a flag true for mobile devices, operating system family, a country name, time zone of the visitor, IP address of the visitor, etc. If an attribute does not have a value, an assigned value might be null or unknown. The data type of the attribute may also be indicated, such as a string, number, or Boolean, for example.

Pre-processing is performed on the raw data in order to obtain datasets for the event2vec algorithm. The event2vec algorithms require original events in the data (as opposed to outcome prediction further described below, which needs data in a format of sequences). Pre-processing is customized to the problem and to the data. Machine learning requires data to be in a specific output, which is achieved with the pre-processing steps outline below:

Remove or mask/encrypt all data columns containing personally identifiable information (PII). This is a way of anonymizing information in order to comply with applicable law.

Identify columns which need to be predicted when model training (the class attribute).

Identify columns which duplicate class attribute and remove. These are often duplicated with repetitive information in the datasets.

Remove array type columns. This removal simplifies the process, however, in an embodiment, these may not be removed. More complex methods of pre-processing are required if the array type columns are not removed.

Convert all Boolean type columns to integer type, replacing true with 1 and false with 0. This is for consistency of format because the algorithms work with numerical integers.

Replace all the null and unknown values with 0, 0.0, unknown for integer, double and string types respectively.

In an embodiment, the steps are performed in a sequential order. In an embodiment, the resulting dataframe comprises the same number of rows as the input dataframe, but a lower number of columns and no null values in any of the columns.

Figure 5:
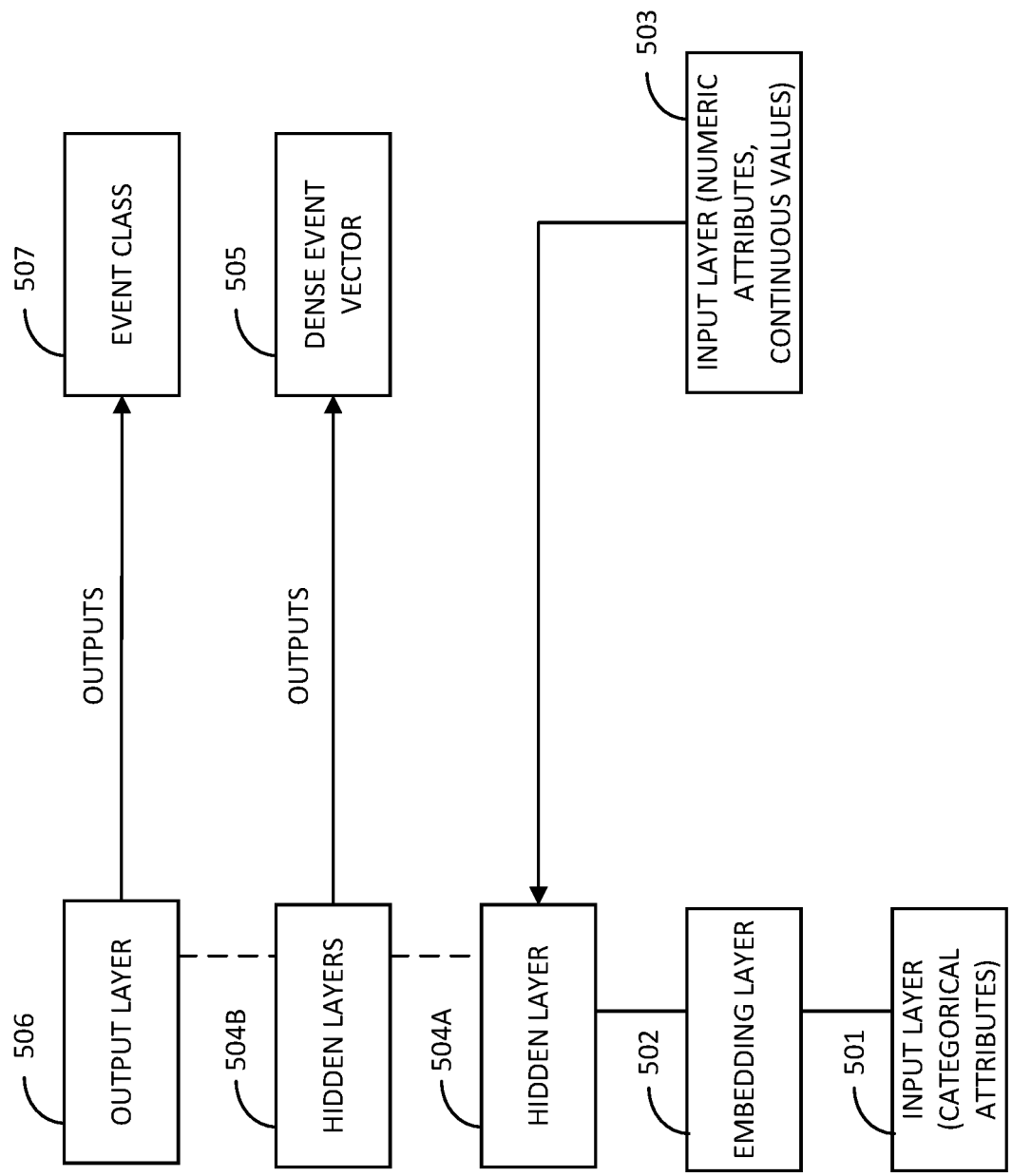
FIG. 5 is a diagram illustrating an embodiment of a system for converting events into vector representations.

Once pre-processing has been performed, datasets are obtained which can be applied into the machine learning algorithms for training and validation. FIG. 5 is a diagram illustrating an embodiment, indicated generally, of a system (neural network) for converting events into vector representations. The system may be present in the analytics module 407. In an embodiment, the system illustrated in FIG. 5 may be obtained by training a feed forward neural network. The system may then be used to predict the event class 507 of an input event. Event class may originally be recorded as an attribute in the raw events data. In an embodiment, an event can belong to a number of classes (e.g., 34, for example) such as page viewed, form filled, interaction accepted, etc. The feedforward network comprises two input layer branches. A first branch may accept categorical attributes 501 while the second branch accepts attributes which contain continuous numeric attributes and/or continuous values 503. The categorical attributes may be defined as the ones with type String. Categorical attributes must be transformed as a vector first before input into the system. As a result, the categorical attributes branch might comprise an extra layer 502 (e.g., the embedding layer). In an embodiment, the numeric attributes 503 may be used without transformation. Once the input 501 comprising categorical attributes are converted in an embedding layer 502, they may be combined with the numeric attributes input 503 in the hidden layer 504A. The neural network is then optimized through additional hidden layers 504B to create an output layer 506 whose outputs are used to predict the class of the event 507. After the network is trained, the dense event vector representations 505 are able to be extracted (using standard algorithms) from the hidden layers 504B. The dense event vectors 505 may be used for outcome prediction (described in greater detail below).

After the model has been trained in the event2vec system, it can accept any event and output the n-dimensional event vector. In an embodiment, the events are represented in datasets as a vector in a common n-dimensional space. An additional event vector column may be appended to the event dataframe which holds the vector output of event2vec model for the corresponding event in the row. The new dataframes can then be used in further analytics, such as outcome prediction as described in greater detail below.

Outcome Prediction

In an embodiment, the customer journey data comprises sequence data, where each journey may be a temporally arranged sequence of events. Not all machine learning algorithms are capable of ingesting and utilizing the sequential information in such data, which is otherwise important for accurate predictive modeling. Sequence learning comprises a class of machine learning algorithms which are capable of ingesting sequential data and encoding the temporal information in the learned models. RNNs comprise a class of neural networks which can work directly on sequences as inputs. In particular Long Short-Term Memory (LSTM) networks, to name a non-limiting example, are optimal for dealing with longer sequences. RNNs are able to input the sequential data by processing one unit of the sequence at a time and updating its encoding of the sequence state. RNN cells are able to retain context information in the internal memory when they process a unit in a sequence.

In an embodiment, an interlocutor (e.g., agent, contact center employee, website hosts, application providers, etc.) can setup the positive and negative outcomes they wish to achieve/avoid—simple ones being "Purchase" or "Support Ticket Closure", more complex ones being "Openness to Sales Engagement". A machine learning component (such as the analytics module 402) can determine which customers, when offered an interaction (e.g., chats, calls, emails, suggestions, video chat, etc.) are more likely to complete a desired outcome. The machine learning component or module captures the data in real-time and predicts the probability of a successful outcome in real-time between a first user (e.g., the customer) and selected second user (e.g., an agent of the contact center). In an embodiment, the machine learning component or module comprises a classification algorithm to learn a complex classification function/model on the captured event sequences and store the learned function/model to classify fresh event sequences and provide a confidence score for the predicted class. The classes are 'outcome achieved' and 'outcome not achieved', and the confidence score is the outcome probability.

The outcome may be captured in a binary fashion at the end of an interaction by either the agent or the system retrieving the outcome programmatically from a CRM or ticketing system that the agent entered the outcome into or upon user completion of a sequence of actions defining an outcome. This forms the feedback loop for the system to understand persona/activity patterns that drive positive outcomes vs. negative outcomes. In an embodiment, outcomes may be presented in an ordered list as potential next best actions for an agent to take and can be altered to include the outcome predictions. As a result, the system, or an agent (who can manually intervene), can offer chats or calls or other actions to customers they desire to achieve a specific outcome who may be in danger of not doing so. This is important as the pool of agents is always limited. Therefore, agent time may be directed towards the types of interactions with customers that have the best likelihood to maximize the defined outcome. In the case of an agent making an offer, machine learning may be applied to present the ranked lists of customer or actions to the agent for a specific outcome for their discretion in which customer to present a specific interaction (whether call, chat, etc.) to.

In an embodiment, a more specific type of neural networks known as RNN, may be used in outcome prediction algorithm. RNNs comprise a major class of deep learning algorithms and offer particular benefits for customer journey modelling. RNNs, in particular LSTMs, are capable of identifying relationships between the elements of long temporal sequences and modelling these as complex mathematical functions. LSTMs have feedback connections that allow for processing of entire sequences of data, unlike standard feedforward neural networks. Manual analysis of the customer journey to identify data properties which are important for outcome prediction is not necessary as a result. RNNs also allow for the visualization of the change in prediction accuracies as sequences of the customer journey grow. Additionally, interpretation and reasoning may be gleaned from the predictions for individual businesses.

Figure 6:
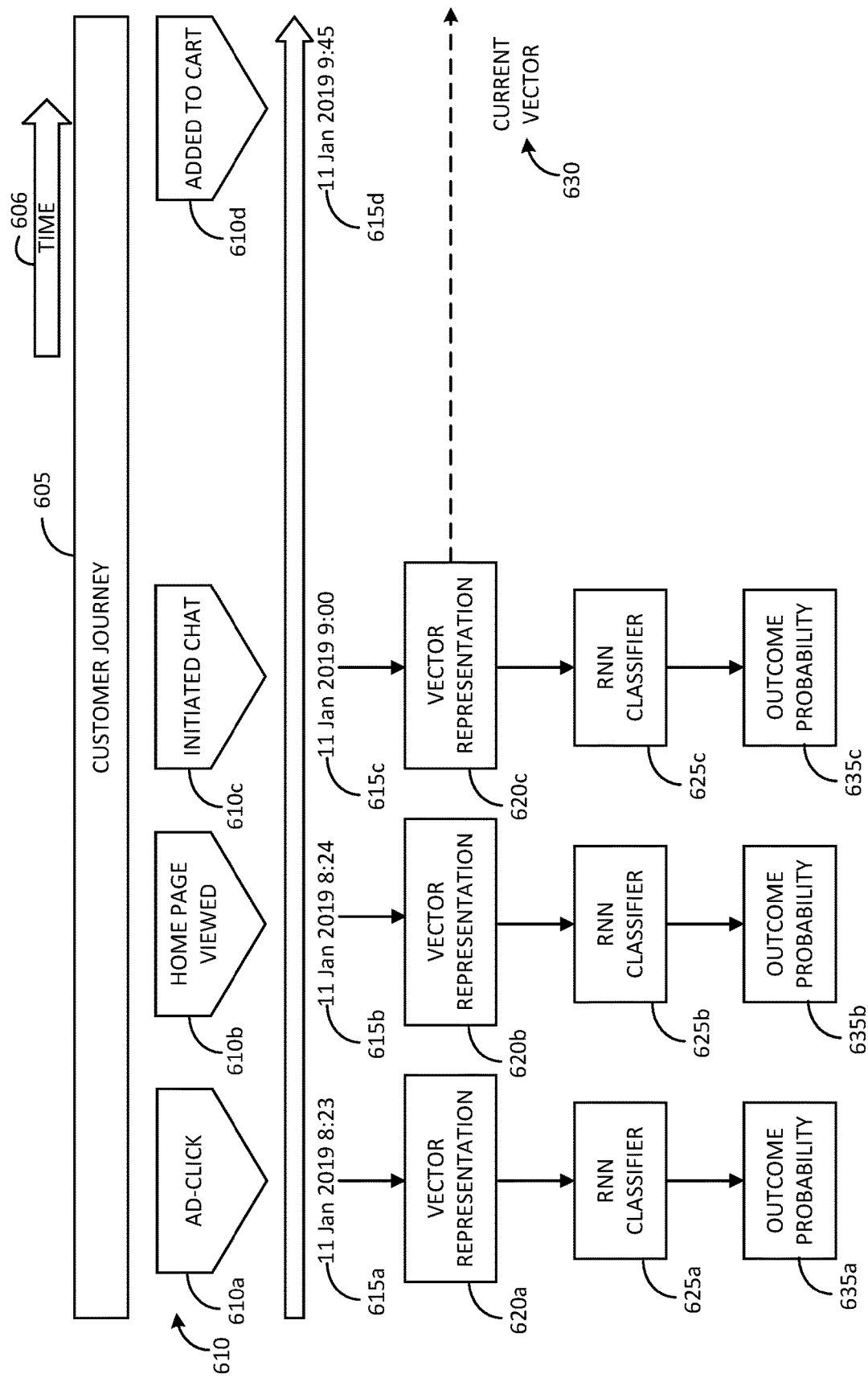
FIG. 6 is a diagram illustrating an embodiment of a process for ingestion of vector representations.

An RNN based classification algorithm is comprised of RNN cell units and may also be combined with Dense type of neuron units. FIG. 6 is a diagram illustrating an embodiment, indicated generally, of a process for ingestion of event vector representations. The event vectors, in an embodiment, may be those created in FIG. 5. The customer journey 605 occurs over some length of time 606 with events 610 occurring in real-time. In FIG. 6, specific events provided for illustrative purposes include an 'ad-click' 610*a* initiated at timestamp '11 Jan. 2019 8:23' 615*a*, 'home page viewed' 610*b* at timestamp '11 Jan. 2019 8:24' 615*b*, 'initiated chat' 610*c* initiated at timestamp '11 Jan. 2019 9:00' 615*c*, and 'added to cart' 610*d* initiated at timestamp '11 Jan. 2019 9:45' 615*d*. The event 610*d* 'added to cart' may additionally be classified as an outcome event, wherein the addition of an item to a cart is a desired outcome. It is within the scope of the embodiments provided herein that any number of events may be used and those provided herein are not meant to be limiting, but for simplicity. Prediction of outcomes may also be obtained for each incremental event 610 over the customer journey 605. The RNN classifier is invoked at each incremental event in the customer journey to make a prediction based on all the sequence of events which took place in the customer journey till the current point of time.

The input layer and hidden layers comprise RNN classifier cells 625 (this is further described in detail in FIG. 7 below). An example of an RNN classifier cell might be an LSTM. Event2vec algorithms are applied to the customer journey data to obtain event vectors 620 for each event (620a, 620b, and 620c). The input layer ingests the corresponding event vector 620a, 620b, and 620c in a timestamp order. Vectors are maintained and updated to summarize the state of the customer journey. A cumulative vector 630 may summarize all previous event vectors. RNN classifier cells 625a, 625b, and 625c ingest vectors and produce outcome probabilities 635a, 635b, 635c at each event 610a, 610b, and 610c of the customer journey.

In order to train an outcome prediction model and obtain outcome predictions on new data, pre-processing of the data needs to be conducted, because the data needs to be in a format of class labeled sequences. The pre-processing of the raw event logs to obtain a labelled sequence dataset is as follows:

Identify the set of outcome IDs for the given business.
Define a dataframe schema with columns capturing visit ID, time ordered sequence of event IDs within a given visit, and class label.
Query the raw events dataframe (the input dataset to event2vec system) to obtain the sequence dataset defined above. Class label column will hold binary values depending on whether an outcome was achieved during the visit or not.
Remove the outcome achieved events from the event sequence.
Replace the event IDs in the sequence column with their respective event vectors using the event2vec system.

The resulting output dataframe has a lower number of rows and a different set of columns than the input event dataframe. Additionally, the output should be in a standard format for RNN to accept the data. The output data is used for training and validation of the algorithms for outcome prediction. FIG. 7 is a diagram illustrating an embodiment, indicated generally, of a system for a sequential neural network as applied in FIG. 6. The output layer comprises a dense neuron layer which inputs an RNN (or more specifically, LSTM, in an embodiment) processed sequence as a single vector. A softmax function is applied to the output of the dense layer. The network is then trained using a labelled sequence dataset. The labelled sequence dataset is obtained from a raw event dataset which has been converted as described above. The labels encode the information that an outcome was achieved or not in a given visit. The system indicated in FIG. 7 may be used for outcome prediction. Input data, comprising data of a customer journey, is represented as a set of vectors. The input layer takes in the event vector in the order of their timestamp, maintains and updates a vector which is a representation of the previous events in the sequence. Each event in the sequence has an RNN cell associated with it, as can be seen in FIG. 7. Each RNN cell outputs an intermediate vector representation to pass to the next RNN cell, which summarizes the state of a customer journey until the currently processed time-step. With the trained model, event vector sequences are ingested and output in binary fashion corresponding to outcome achieved or not-achieved (e.g., 1 or 0, respectively).

Use cases of outcome prediction apply to organizations dealing with multiple businesses, eliminating the need of huge manual effort to identify important event attributes for predictive modelling. The system has a generalization capability specifically for new customers who may not have journey examples present in the training or historical data.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for obtaining vector representations for web events comprising:
   a. logging and storing events from the browsing sessions, wherein the events comprise activity data from the plurality of customers;
   b. pre-processing the raw data captured on the website, wherein the pre-processing further comprises the steps of:
      i. removing or masking/encrypting values in all columns containing personally identifiable information,
      ii. identifying class attributes which need to be predicted when model training,
      iii. identifying and removing columns which duplicate class attributes,
      iv. removing array type data,
      v. removing timestamp data,
      vi. converting all Boolean type data into integer type, and
      vii. replacing all null and unknown values, and
   c. obtaining the ingestible datasets, which are capable of application to an algorithm for obtaining vector representations of web events;
   d. training a feed forward neural network with the ingestible datasets;
   e. inputting the web events into the feed forward neural network, wherein, the output comprises vector representations of each activity in the web events; and
   f. appending vector columns to datasets for the corresponding activity in the web events,
   receiving, by the feed forward neural network models, stored events data from a plurality of customer's browsing sessions on a website;
   modeling, by the feed forward neural network models, a customer journey of a customer; and
   providing, by the feed forward neural network models, predicted outcomes related to the customer.

2. The method of claim 1, wherein the vector representations comprise a common n-dimensional space; and wherein the predicted outcomes comprise a sale probability during a session of the customer.

3. The method of claim 1, wherein the training comprises prediction of the event class of input; and wherein the predicted outcomes comprise a routing of an interaction of the customer to a more preferable agent.

4. The method of claim 3, wherein the trained feed forward neural network comprises a plurality of input layer branches.

5. The method of claim 4, wherein the plurality of input layer branches further comprises at least a first branch accepting categorical attributes and a second branch accepting continuous numerical value attributes.

6. The method of claim 1, wherein the events are stored with a common schema.

7. The method of claim 1, wherein the converting of all Boolean type data into an integer type further comprises replacing 'true' with a 1, and 'false' with a 0.

8. The method of claim 1, wherein the replacing all null and unknown values further comprises replacing all null and unknown values for integer types with a 1, with a 0.0 for double types, and 'unknown' for string types.

9. The method of claim 1, wherein the pre-processing steps are performed in sequential order.

10. The method of claim 1, wherein each event comprises a schema comprising characteristics and modalities.

11. The method of claim 1, further comprising the steps of:
   a. inputting the appended datasets into a trained neural network comprising LSTM cell units and dense neuron units, wherein input and hidden layers of the neural network comprise LSTM cell units and an output layer comprises the dense neuron units;
   b. obtaining a processed sequence which is input into the dense neuron layer as a single vector;
   c. applying a softmax function to the single vector; and
   d. obtaining an outcome probability for the vector.

12. The method of claim 11, wherein the neural network has been trained using data pre-processed, the method for pre-processing comprising:
   a. identifying a set of outcome IDs for a given entity;
   b. defining a dataframe schema capturing visit ID, time ordered sequence of event IDs within a given visit, and class label;
   c. querying an event dataframe to populate the defined dataframe;
   d. removing outcome events from the sequence; and
   e. replacing event IDs with the respective event vectors.

13. The method of claim 11, wherein the input layer accepts input in order of timestamp.

14. The method of claim 11, wherein the single vector comprises a representation of the previous events in the sequence.

* * * * *